(12) United States Patent
Doo et al.

(10) Patent No.: US 8,052,427 B2
(45) Date of Patent: Nov. 8, 2011

(54) CONNECTOR ASSEMBLY FOR COUPLING AN ELECTRIC MOTOR TO A POWER SOURCE

(75) Inventors: Young M. Doo, La Palma, CA (US); Mark D. Korich, Chino Hills, CA (US); Mark L. Selogie, Manhattan Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 12/416,410

(22) Filed: Apr. 1, 2009

(65) Prior Publication Data

US 2010/0255686 A1 Oct. 7, 2010

(51) Int. Cl.
*H01R 33/00* (2006.01)
(52) U.S. Cl. .......................................... 439/34
(58) Field of Classification Search .................. 439/34, 439/188, 342, 345, 824, 156, 152, 160
See application file for complete search history.

(56) References Cited

U.S. PATENT DOCUMENTS

| | | | | |
|---|---|---|---|---|
| 2,736,870 | A | * | 2/1956 | De Jur Harry et al. ....... 439/152 |
| 2,879,495 | A | * | 3/1959 | Ingram .......................... 439/156 |
| 4,266,841 | A | | 5/1981 | Sherwood |
| 4,316,304 | A | * | 2/1982 | Parise et al. ...................... 15/339 |
| 6,773,312 | B2 | | 8/2004 | Bauer et al. |
| 7,316,592 | B2 | * | 1/2008 | Chan et al. .................... 439/824 |

FOREIGN PATENT DOCUMENTS

DE 10143200 A1 4/2003

OTHER PUBLICATIONS

German Office Action for German Application No. 102010003117.8 mailed Apr. 7, 2011.

* cited by examiner

*Primary Examiner* — Edwin A. Leon
(74) *Attorney, Agent, or Firm* — Ingrassia Fisher & Lorenz P.C.

(57) ABSTRACT

A connector assembly is provided for coupling an electric motor to a power source, wherein the power source comprises a first conductive member. The connector assembly comprises a non-conductive member having an inner channel configured to receive at least a portion of the first conductive member, a second conductive member slidably disposed within the inner channel, coupled to the electric motor, and configured to be coupled to, and to receive a force having a first direction from, the first conductive member, and a spring member, retained between the non-conductive member and the second conductive member and configured to resist movement of the second conductive member in the first direction.

13 Claims, 6 Drawing Sheets

CONNECTOR ASSEMBLY FOR COUPLING AN ELECTRIC MOTOR TO A POWER SOURCE

TECHNICAL FIELD

The present invention generally relates to vehicular electrical systems, and more particularly relates to a connector assembly for coupling an electric motor to a to a power source for use in vehicles.

BACKGROUND OF THE INVENTION

Increasingly, modern vehicles are configured to use electric traction motors to drive wheels. For example, a vehicle may include an alternating current (AC) traction motor that is coupled to an inverter. The inverter converts direct current (DC) received from a power source (e.g., a battery) to alternating current that can be used by the AC traction motor. In general, inverters use a combination of switches, or transistors, operated at various intervals to convert DC power to AC power. The AC traction motor receives the AC power via one or more inverter output terminals.

Typically, AC traction motors are coupled to the inverter output terminal via a cable assembly. The cable assembly includes a cable that is coupled to the AC traction motor and the inverter output terminal via one or more pluggable connectors, ring connectors, crimp connectors, or other suitable electrical connector types. In addition, the cable may be secured within the vehicle via one or more clips or brackets. Cable assemblies such as the one described above provide an effective mechanism for coupling an AC traction motor to an inverter output terminal.

However, the use of a cable assembly does have certain disadvantages. For example, the cable assembly must be connected, and disconnected, each time the inverter is installed on, or removed from, the vehicle, increasing the complexity and cost of manufacturing, or repairing, the vehicle. Further, the cable assembly is subject to vibrations, heat, and other conditions within the vehicle that can damage the cable or cause it to become disconnected. Under such circumstances, it may be necessary to replace or reconnect the cable resulting in additional expense to the vehicle owner.

Accordingly, it is desirable to provide a connector assembly for coupling an AC traction motor to an inverter output terminal that does not require a cable. In addition, it is also desirable to provide a connector assembly that enables an inverter to be installed on, or removed from, a vehicle without the need to connect, or disconnect, a cable. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment a connector assembly is provided for coupling an electric motor to a power source, wherein the power source comprises a first conductive member. The connector assembly comprises a non-conductive member having an inner channel configured to receive at least a portion of the first conductive member, a second conductive member slidably disposed within the inner channel, coupled to the electric motor, and configured to be coupled to, and to receive a force having a first direction from, the first conductive member, and a spring member, retained between the non-conductive member and the second conductive member and configured to resist movement of the second conductive member in the first direction.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-7 are merely illustrative and may not be drawn to scale.

Figure 1:
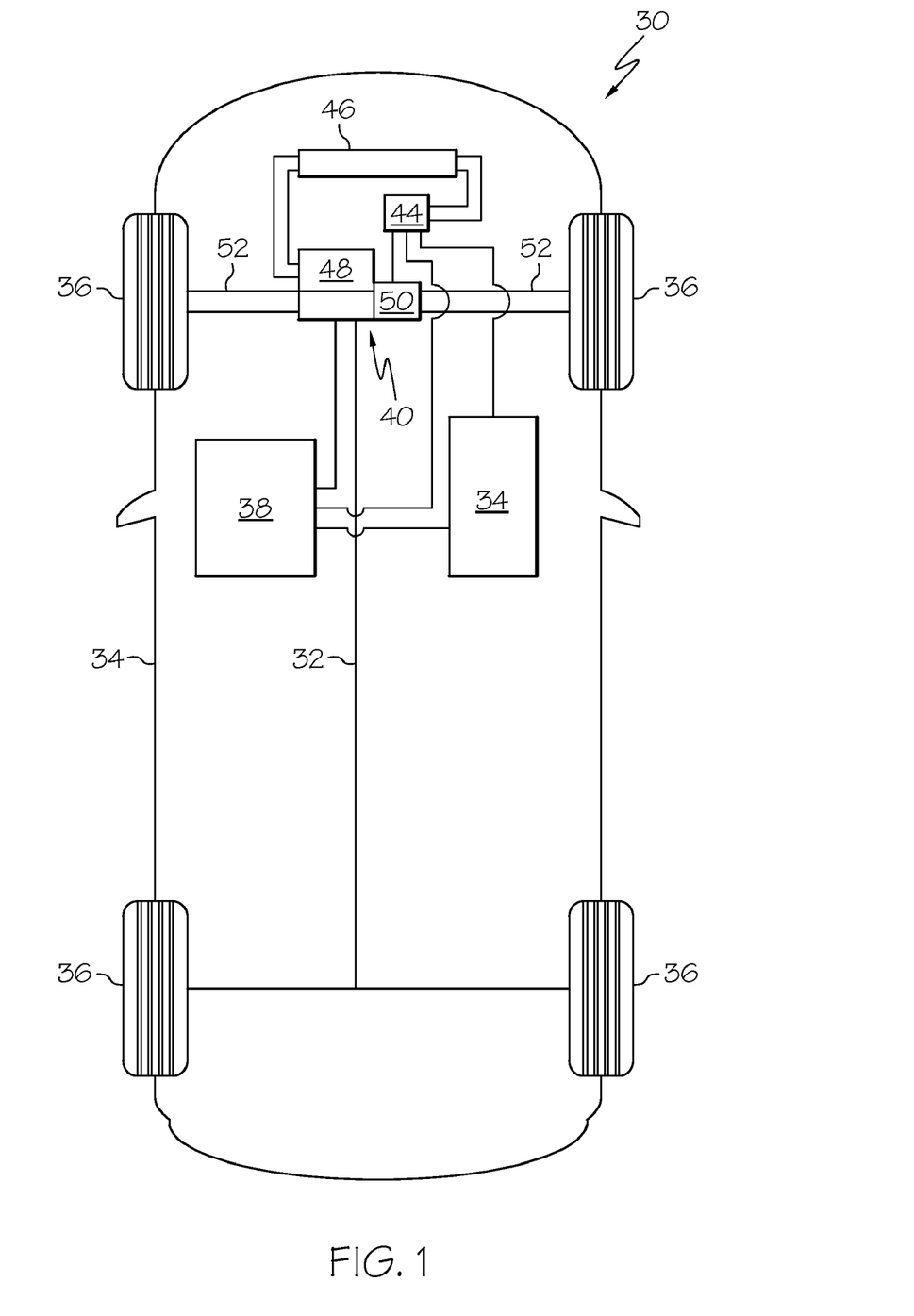
FIG. 1 is a schematic view of an exemplary vehicle.

FIG. 1 illustrates a vehicle 30, or "automobile," according to one embodiment. The automobile 30 includes a chassis 32, a body 34, four wheels 36, and an electronic control system (or electronic control unit (ECU)) 38. The body 34 is arranged on the chassis 32 and substantially encloses the other components of the automobile 30. The body 34 and the chassis 32 may jointly form a frame. The wheels 36 are each rotationally coupled to the chassis 32 near a respective corner of the body 34.

The automobile 30 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

The vehicle 30 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the illustrated embodiment, the automobile 30 is a hybrid vehicle, and further includes an actuator assembly (or powertrain) 40, a battery (or DC power source) 42, an inverter system 44, and a radiator 46. The powertrain 40 includes an internal combustion engine 48 and an electric motor (or motor/generator) system 50. Electric motor system 50 is coupled to combustion engine 48 and to inverter system 44. Although not shown in detail, electric motor system 50 includes a housing, a transmission, and one or more electric motors. In one embodiment, electric motor system 50 includes two electric motors, each comprising a stator assembly (including conductive motor windings) and a rotor assembly (including a ferromagnetic core). The stator assembly and/or the rotor assembly may include multiple electromagnetic poles (e.g., sixteen poles), as is commonly understood.

Inverter system 44 is coupled to ECU 38, battery 42, radiator 46, and electric motor system 50. Inverter system 44 includes one or more inverters that convert DC power received from battery 42 to AC power for use by electric motor system 50. In one embodiment, inverter system 44 includes two inverters, each having a plurality of inverter output terminals. Each inverter output terminal may be coupled to a motor winding of electric motor system 50 via an embodiment of the connector assembly described below. Battery 42 comprises a high voltage battery suitable for powering electric motor system 50 (e.g., a lithium ion battery).

Combustion engine 48 and the electric motor system 50 are integrated such that both are mechanically coupled to at least some of the wheels 36 through one or more drive shafts 52. The radiator 46 is connected to the frame at an outer portion thereof and although not illustrated in detail, includes multiple cooling channels therethough that contain a cooling fluid (i.e., coolant) such as water and/or ethylene glycol (i.e., "antifreeze") and is coupled to combustion engine 48 and inverter system 44. In the depicted embodiment, combustion engine 48 receives and shares coolant with the electric motor system 50. However, radiator 46 may also be separately connected to combustion engine 48 and electric motor system 50.

ECU 38 is in operable communication with the actuator assembly 40, the battery 42, and the inverter system 44. Although not shown in detail, the electronic control system 38 includes various sensors and automotive control modules, or electronic control units, such as body control module, an inverter control module, and a vehicle controller, and at least one processor and/or a memory which includes having instructions and/or data stored thereon.

Figure 2:
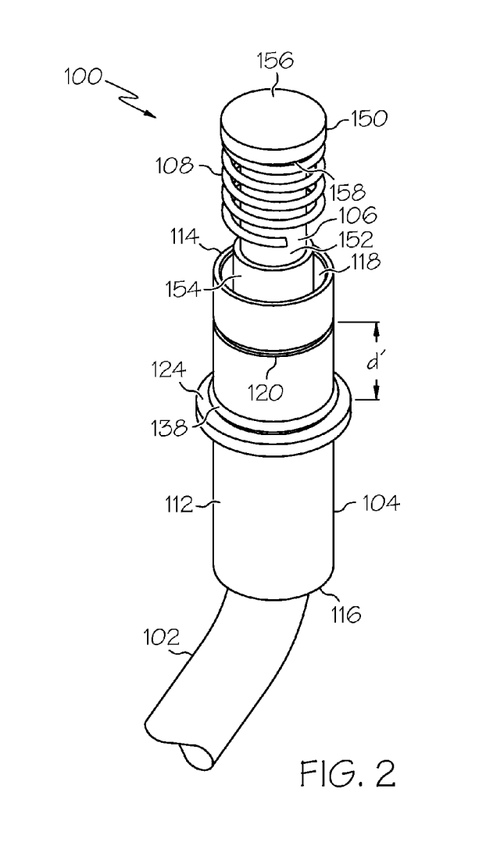
FIG. 2 is an isometric view of an exemplary connector assembly for coupling a motor winding to an inverter output terminal.

FIG. 2 is an isometric view of a connector assembly 100 for coupling a motor winding 102 to an inverter output terminal. Connector assembly 100 includes a non-conductive plastic sleeve 104, a conductive rod 106, and a spring member 108. In the depicted embodiment, sleeve 104 comprises a hollow cylinder having an outer surface 112, a top 114, a bottom 116, and an inner channel 118 extending from top 114 to bottom 116. As further described below, sleeve 104 is disposed and retained within an opening of the housing for an electric motor system (e.g., electric motor system 50 of FIG. 2) and provides electrical isolation between conductive rod 106 (and motor winding 102) and the electric motor system housing. Accordingly, sleeve 104 may be constructed of a durable and electrically insulating material (e.g., plastic).

For convenience of description, conductive rod 106 and spring member 108 are shown extending above the top 114 of sleeve 104. However, as described below when connector assembly 100 is coupled to an inverter output terminal, conductive rod 106 and spring member 108 are completely disposed within sleeve 104. In addition, it should be noted that although sleeve 104 is depicted as a hollow cylinder, alternative embodiments may include other shapes (e.g., a torus or a hollow cuboid) having an inner channel extending one side to another.

Figure 3:
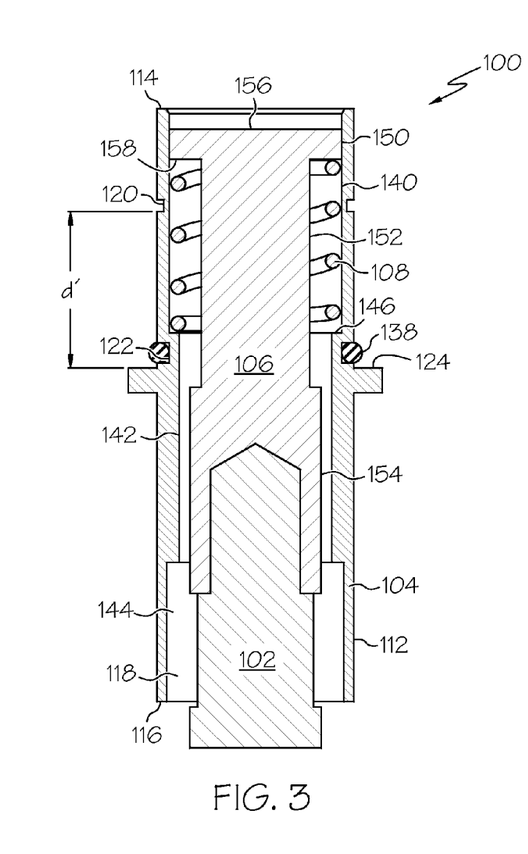
FIG. 3 is cross-sectional view of the connector assembly of FIG. 2.

FIG. 3 is a cross-sectional view of the connector assembly 100 of FIG. 1, depicting motor winding 102, non-conductive sleeve 104, conductive rod 106, and spring member 108. As shown, conductive rod 106 and spring member 108 are disposed completely within non-conductive sleeve 104. With reference to FIGS. 2 and 3, the outer surface 112 of sleeve 104 includes an annular first groove 120, an annular second groove 122, and an annular flange 124. Flange 124 extends outwardly from the outer surface 112 and is separated from first groove 120 by a distance (d'). As described below, d' should be substantially equal to the depth of the opening within the electric motor system housing where sleeve 104 is positioned and retained. Finally, second groove 122 is proximate to flange 124 and receives an O-ring 138.

Inner channel 118 of sleeve 104 includes a plurality of cylindrically shaped longitudinal sections. In the depicted embodiment, inner channel 118 includes an upper section 140, a middle section 142, and a lower section 144. As described below, upper section 140 receives a conductive member of a terminal block that is coupled to an inverter output terminal. Middle section 142 has a smaller diameter than upper section 140 and is separated from upper section 140 by a flange 146 that extends outwardly from the inner channel 118. Lower section 144 receives a portion of motor winding 102 and (as shown) may have a larger diameter than middle section 142.

Conductive rod 106 is coupled to motor winding 102. As described above, motor winding 102 is coupled to the stator assembly of an electric motor (e.g., an electric motor of electric motor system 50 of FIG. 2). Rod 106 may be crimped, welded, soldered, or otherwise coupled to the motor winding 102. Further, rod 106 is constructed of an electrically conductive material, such as aluminum, copper, sliver, gold, or an alloy thereof.

Rod 106 is slidably disposed within sleeve 104 and comprises a plurality of cylindrically shaped longitudinal segments, including an upper segment 150, a middle segment 152, and a lower segment 154. Upper segment 150 has a larger diameter than middle section 142 of inner channel 118. Thus, upper segment 150 is retained within the upper section 140 of inner channel 118 by flange 146. In the depicted embodiment, upper segment 150 extends radially outward to sealably engage the upper section 140 of inner channel 118.

In addition, upper segment 150 includes an upper surface 156. As described further below, upper surface 156 is mated with a congruent surface of a terminal block that is coupled to an inverter output terminal. As depicted, upper surface 156 is a flat disk. However, alternative embodiments of rod 106 may comprise upper surfaces having different shapes (e.g., oval, square, rectangle, etc.) and different surface features (e.g., concavity or convexity).

Middle segment 152 has a smaller diameter than middle section 142 of inner channel 118 and is separated from upper segment 150 by a flange 158 that extends outwardly from rod 106. Lower segment 154 is coupled to motor winding 102 and also has a diameter that is smaller than the middle section 142 of inner channel 118. Thus, middle segment 152 and lower segment 154 are able to slide within each section 140, 142, 144 of inner channel 118.

Finally, spring member 108 is retained between sleeve 104 and rod 106 and configured to resist movement of rod 106 away from top 114 (or toward the bottom 116) of sleeve 104. As depicted, spring member 108 comprises a coil spring that is disposed around the middle segment 152 of rod 106 and is bounded between flange 158 of rod 106 and flange 146 of inner channel 118. Spring member 108 is in a neutral state when upper surface 156 is positioned near the top 114 of sleeve 104. Spring member 108 is compressed away from its neutral state when rod 106 is moved away from the top 114 (or toward the bottom 116) of sleeve 104. This compression of spring member 108 generates a spring force that resists the movement of rod 106.

Although the embodiments of connector assembly 100 depicted and described above include a non-conductive sleeve 104 and rod 106 having cylindrically shaped sections and segments, it should be noted that alternative embodiments may comprise sleeves and rods having other shapes and configurations. For example, the sections of sleeve 104 and segments of rod 106 may comprise cuboids, cylindroids or other geometric shapes.

Figure 4:
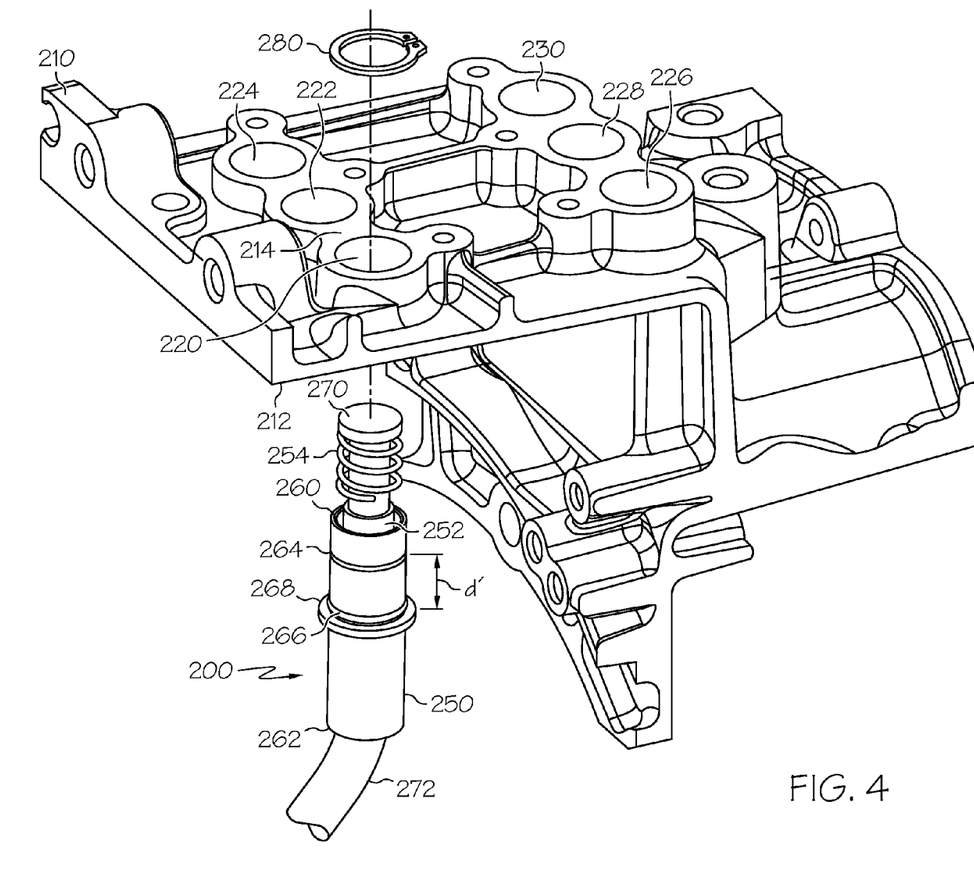
FIG. 4 is an isometric view of the connector assembly of FIG. 2 and a portion of an electric motor system housing.

FIG. 4 is an isometric view depicting the connector assembly 200 of FIG. 2 and a portion of an exemplary housing 210. Housing 210 encloses an electric motor system (e.g., electric motor system 50 of FIG. 1) within a vehicle (e.g., vehicle 10 of FIG. 1) and includes an interior surface 212 and an exterior surface 214. The exterior surface 214 comprises a variety of surface features, including six circular openings 220, 222, 224, 226, 228, 230 that extend from the interior surface 212 to the exterior surface 214. As described below, connector assembly 200 may be positioned, and retained, within one of the six openings (e.g., opening 220 as shown). Additional connector assemblies may also be positioned, and retained, within the other openings 222, 224, 226, 228, and 230 in substantially the same manner.

Connector assembly 200 includes the non-conductive sleeve 250, the conductive rod 252, and the spring member 254. As described above, non-conductive sleeve 250 includes a top 260, a bottom 262, an inner channel 118 (FIG. 2), an annular first groove 264, an O-ring 266, and an annular flange 268. First groove 264 is separated from flange 268 by a distance (d') that is substantially equal to the depth of opening 220. Conductive rod 252 is disposed within the inner channel of sleeve 250 and includes an upper surface 270. Further, conductive rod 252 is coupled to a motor winding 272 for a non-illustrated electric motor.

Figure 5:
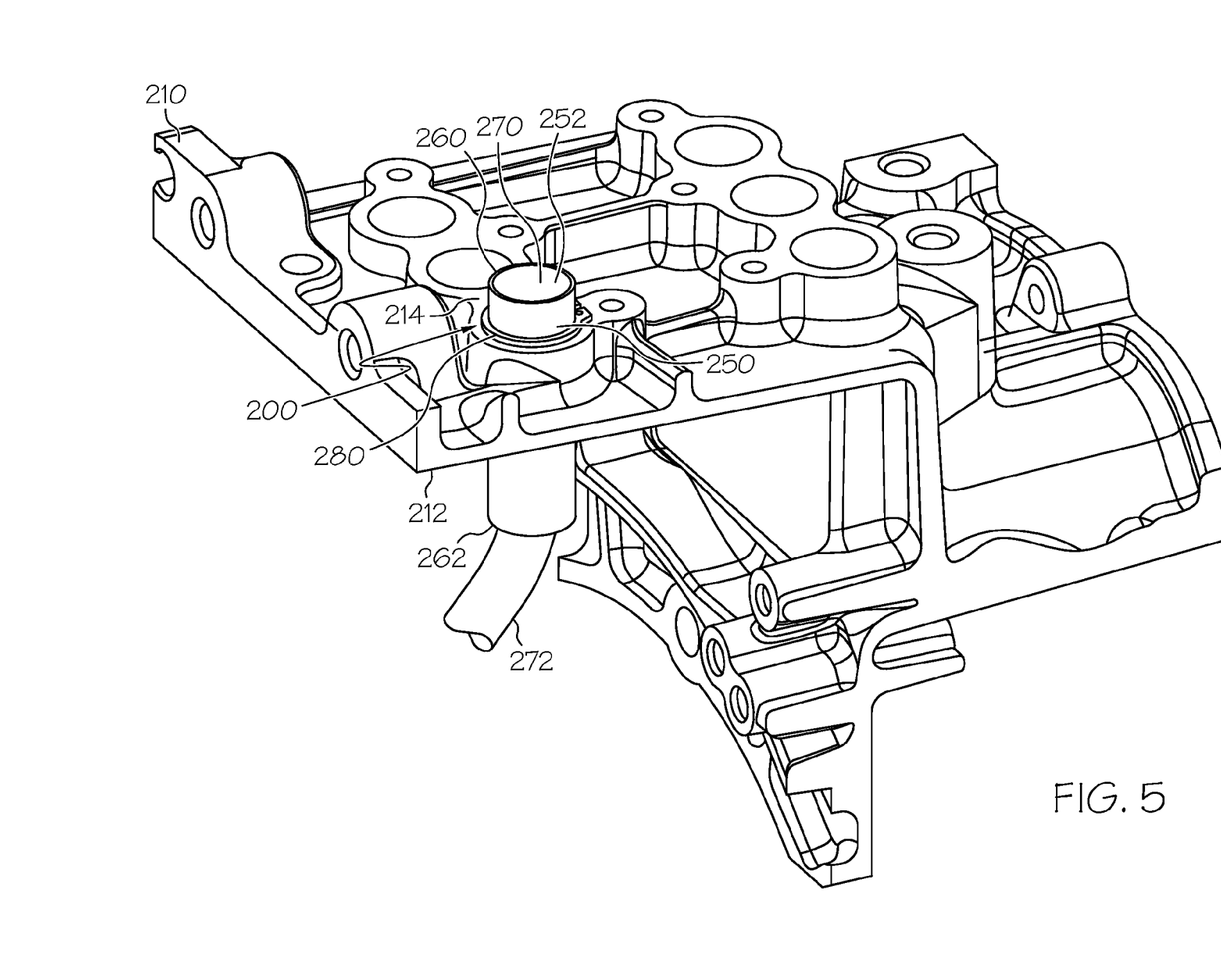
FIG. 5 is an isometric view of the connector assembly of FIG. 4 coupled to an electric motor system housing.

FIG. 5 is an isometric view depicting the connector assembly 200 of FIG. 4 coupled to the electric motor system housing. With reference to FIGS. 4 and 5, connector assembly 200 is coupled to housing 210 by inserting sleeve 250 through opening 220 until flange 268 is proximate to the interior surface 212 of housing 210. First groove 264 will then be substantially level with exterior surface 214 of housing 210 (e.g., because the depth of opening 220 is substantially the same as d') and receives a retaining ring 280 that extends outwardly from sleeve 250 and is proximate to the exterior surface 214 of housing 210. Retaining ring 280 should be constructed of a durable material (e.g., metal or a hard plastic) to prevent movement of sleeve 250. Finally, O-ring 266 is disposed between sleeve 250 and opening 220 and provides a sealable connection between sleeve 250 and housing 210.

As depicted in FIG. 5, when sleeve 250 is retained within housing 210, the top 260 of sleeve 250 extends beyond the interior surface 212 and the bottom 262 extends beyond the exterior surface 214. In addition, upper surface 270 is exposed at the top 260 of sleeve 250 and motor winding 272 extends through the bottom 260 of sleeve 250. Thus, sleeve 250 electrically isolates housing 210 from both the conductive rod 252 and the motor winding 272.provides electrical isolation between housing 210 and the conductive rod 252 and motor winding 272.

Figure 6:
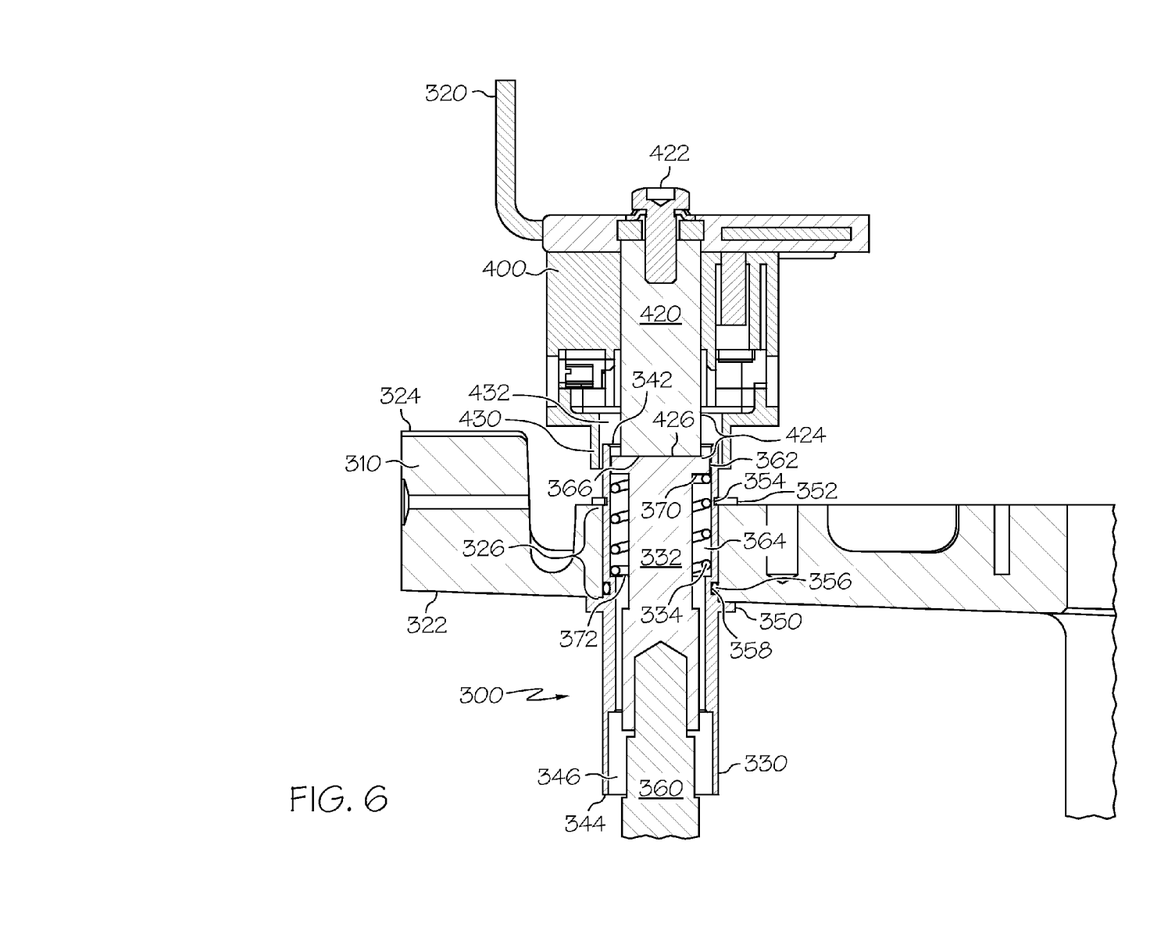
FIG. 6 is a cross-sectional view of the connector assembly of FIG. 2 coupled to an electric motor system housing and aligned with an inverter output terminal.

FIG. 6 is a cross-sectional view of the connector assembly 300 of FIG. 2 coupled to a housing 310 and aligned with an inverter output terminal 320. As described above, housing 310 encloses an electric motor system (e.g., electric motor system 50 of FIG. 1) within a vehicle (e.g., vehicle 10 of FIG. 1) and includes an interior surface 322, an exterior surface 324, and a circular opening 326. Connector assembly 300 includes a non-conductive sleeve 330, a conductive rod 332, and a spring member 334. As described above, sleeve 330 includes a top 342, a bottom 344, and an inner channel 346 extending from top 342 to bottom 344. Sleeve 330 is retained within opening 326 of housing 310 by flange 350 on the interior surface 322 and a retaining ring 352 that extends outwardly from first groove 354 on the exterior surface 324. An O-ring 356 is retained within second groove 358 and disposed between opening 326 and sleeve 330 to provide a sealable connection between sleeve 330 and housing 310.

Conductive rod 332 is coupled to motor winding 360 and is slidably disposed within inner channel 346 of sleeve 330. As described above, rod 332 includes an upper segment 362 that is retained within an upper section 364 of inner channel 346 and includes an upper surface 366. Spring member 334 retained between flange 370 on conductive rod 332 and flange 372 on the inner channel 346.

Inverter output terminal 320 is coupled to an inverter system (e.g., an inverter of inverter system 44 of FIG. 1) that is positioned within the vehicle. As described above, inverter output terminal 320 is configured to provide AC power for use by the electric motor system. Inverter output terminal 320 may comprise a busbar or any other suitable terminal type. In the depicted embodiment, an overmolded terminal block 400 is coupled to inverter output terminal 320. Terminal block 400 includes a conductive member 420 that is electrically coupled to inverter output terminal 320 via bolt 422. In one embodiment, conductive member 420 comprises a cylindrical shaft.

A segment 424 of conductive member 420 extends beyond the molding of terminal block 400. Segment 424 includes a lower surface 426 that is congruent to upper surface 366 of rod 332. In addition, segment 424 is surrounded by an overmolded ring 430. Finally, a gap 432 is provided between ring 430 and segment 424.

As depicted, when the inverter system is positioned within the vehicle, inverter output terminal 320 and terminal block 400 are aligned with connector assembly 300. Gap 432 of terminal block 400 receives the top 342 of sleeve 330. Further, upper surface 366 of conductive rod 332 and lower surface 426 of conductive member 420 are congruently mated. The connection between surfaces 366 and 426 electrically couples inverter output terminal 320 to motor winding 360, enabling the electric motor system to receive AC power from the inverter system.

Figure 7:
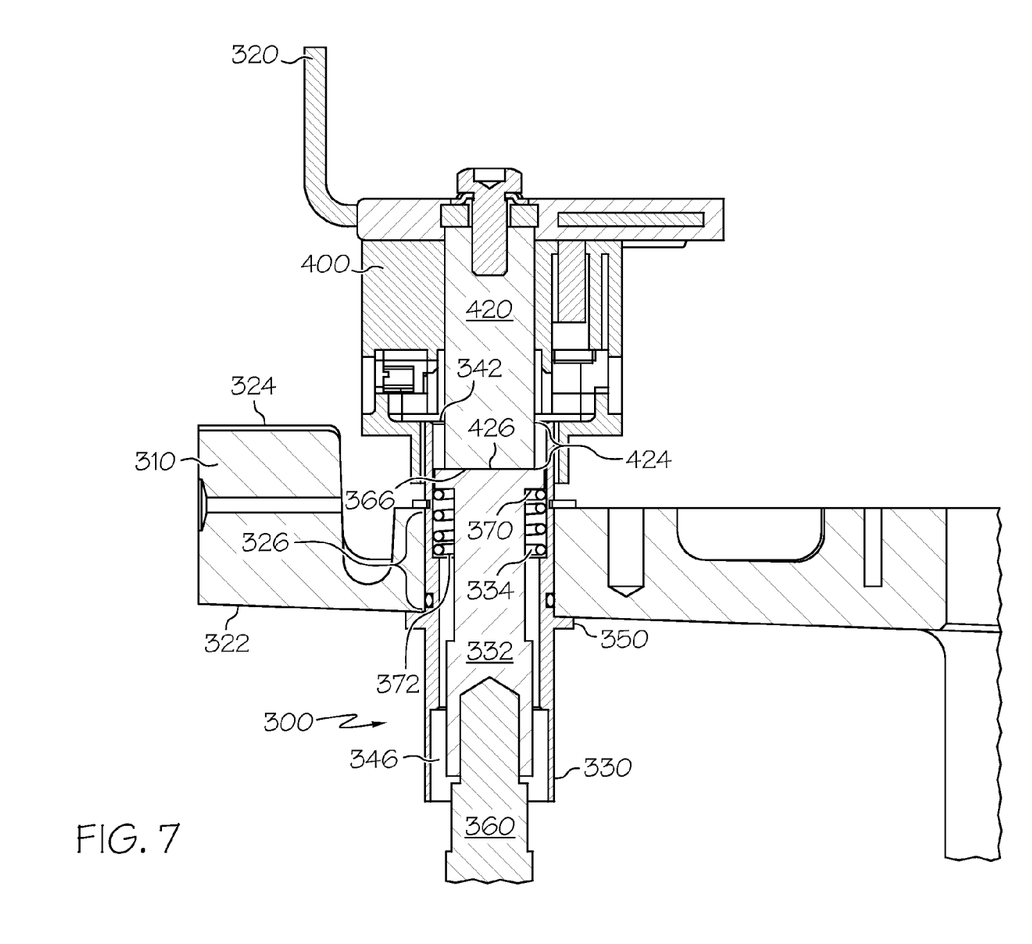
FIG. 7 is a cross-sectional view of the connector assembly of FIG. 6 coupled to an electric motor system housing and to an inverter output terminal.

FIG. 7 is a cross-sectional view of the connector assembly 300 of FIG. 6 that is coupled to housing 310 and to inverter output terminal 320. The inverter system (e.g., inverter system 44 of FIG. 1) is secured (e.g., bolted, welded, etc.) within the vehicle (e.g., vehicle 10 of FIG. 1) causing inverter output terminal 320, and, consequently, terminal block 400, to move toward the exterior surface 324 of housing 310 is decreased. As a result, segment 424 of conductive member 420 is further received within inner channel 346 of sleeve 330. Conductive rod 332 receives a force from conductive member 420 (via lower surface 426 and upper surface 366) that moves conductive rod 332 away from the top 342 of sleeve 330 (or towards the interior of housing 310). This movement of rod 332 compresses spring member 334 between flange 370 of rod 332 and flange 372 of sleeve 330. As described above, the compression of spring member 334 generates a spring force that resists the movement of rod 332 away from the top 342 of sleeve 330 (or toward the interior of housing 310). This spring force compresses upper surface 366 of rod 332 against lower surface 426 of conductive member 420, providing a reliable electrical coupling between motor winding 360 and inverter output terminal 320. In addition, the spring force provides assistance to maintenance personnel or other individuals that remove the inverter system, because the spring force presses terminal block 400 away from connector assembly 300.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A connector assembly for coupling an electric motor to a power source, wherein the electric motor is disposed within a housing having an interior surface, an exterior surface, and an opening extending from the interior surface to the exterior surface, the power source comprises a first conductive member, and the connector assembly comprises:
    a non-conductive member having an inner channel configured to receive at least a portion of the first conductive member and a sleeve that is retained within the opening of the housing, the sleeve having an outer surface that comprises:
        a first annular groove for receiving a retaining ring that extends outwardly from the outer surface; and
        an annular flange extending outwardly from the outer surface and separated from the first annular groove by a distance that is substantially equal to the depth of the opening within the housing, wherein the non-conductive sleeve is retained within the opening by the annular flange on the interior surface of the housing and the retaining ring that is inserted within the first annular groove on the exterior surface of the housing;
    a second conductive member slidably disposed within the inner channel, coupled to the electric motor, and configured to be coupled to, and to receive a force having a first direction from, the first conductive member; and
    a spring member, retained between the non-conductive member and the second conductive member and configured to resist movement of the second conductive member in the first direction.

2. The connector assembly of claim 1, wherein the inner channel comprises:
    a first section that retains a first segment of the second conductive member and receives at least a portion of the first conductive member; and
    an additional flange extending outwardly from the inner channel and separating the first section from the rest of the inner channel, wherein the spring member is retained within the first section of the inner channel and bounded between the additional flange and the first segment of the second conductive member.

3. The connector assembly of claim 1, wherein the outer surface of the non-conductive sleeve further comprises:
    a second annular groove proximate to the annular flange and configured to receive an O-ring, wherein the O-ring provides a sealable connection between the housing and the non-conductive sleeve when the non-conductive sleeve is retained within the opening.

4. The connector assembly of claim 1, wherein:
    the first segment of the second conductive member is retained within the first section of the inner channel and configured to be electrically coupled to, and receive the force having a first direction from, the first conductive member;
    a second segment coupled to the electric motor; and
    a second additional flange extending outwardly from the second conductive member and separating the first segment from the rest of the second conductive member, wherein the spring member is retained between the first flange of the inner channel and the second flange of the second conductive member.

5. The connector assembly of claim 4, wherein the first conductive member further comprises a first surface and the second conductive member further comprises:
    a second surface disposed on the first segment and configured to be mated with the first surface when the second conductive member is electrically coupled to, and receives the force having the first direction from, the first conductive member.

6. The connector assembly of claim 5, wherein the first segment of the second conductive member extends radially outward to sealably engage the first section of the inner channel.

7. A system for coupling an inverter output terminal to an electric motor on a vehicle, the electric motor disposed within a housing having an interior surface, an exterior surface, and an opening extending from the interior surface to the exterior surface, the system comprising:
    a terminal block comprising a conductive member electrically coupled to the inverter output terminal; and
    a connector assembly comprising:
        a non-conductive sleeve having an inner channel extending therethrough, the inner channel configured to receive at least a portion of the conductive member, the non-conductive sleeve retained within the opening and comprising a top extending beyond the exterior surface of the housing and a bottom extending beyond the interior surface of the housing;
        a conductive rod slidably disposed within the non-conductive sleeve, coupled to the electric motor, and configured to be electrically coupled to, and receive a force having a first direction from, the conductive member; and
        a spring member retained between the non-conductive sleeve and the conductive rod and configured to resist movement of the conductive rod in the first direction;
    wherein the inner channel extends from the top to the bottom of the non-conductive sleeve and comprises:
        a first section proximate to the top of the non-conductive sleeve that retains a first segment of the conductive rod and receives at least a portion of the conductive member; and
        a first flange extending outwardly from the inner channel, wherein the spring member is retained between the first segment of the conductive rod and the first flange and configured to resist movement of the conductive rod away from the top of the non-conductive sleeve.

8. The system of claim 7, wherein the non-conductive sleeve has an outer surface that comprises:
   a first annular groove for receiving a retaining ring that extends outwardly from the outer surface; and
   an annular flange extending outwardly from the outer surface and separated from the annular groove by a distance that is substantially equal to the depth of the opening, wherein the non-conductive sleeve is retained within the opening by the annular flange on the interior surface of the housing and the retaining ring that is inserted within the first annular groove on the exterior surface of the housing.

9. The system of claim 8, wherein the outer surface of the non-conductive sleeve further comprises:
   a second annular groove proximate to the annular flange and configured to receive an O-ring, wherein the O-ring provides a sealable connection between the housing and the non-conductive sleeve when the non-conductive sleeve is retained within the opening.

10. The system of claim 7, wherein the conductive rod further comprises:
    a first segment retained within the first section of the inner channel and configured to be electrically coupled to the conductive member;
    a second segment coupled to the electric motor; and
    a second flange extending outwardly from the conductive rod and separating the first segment from the rest of the conductive rod, wherein the spring member is retained between the first flange of the inner channel and the second flange of the conductive rod and configured to resist movement of the conductive rod away from the top of the non-conductive sleeve.

11. The system of claim 10, wherein the first conductive member further comprises a first surface and the conductive rod further comprises:
    a second surface disposed on the first segment and configured to be mated with the first surface and to receive a force from the conductive member that causes the conductive rod to move away from the top of the non-conductive sleeve.

12. A system for providing alternating current power from an inverter to a motor winding of an alternating current (AC) motor on a vehicle, the AC motor having a housing that comprises an interior surface, an exterior surface, and an opening extending from the interior surface to the exterior surface, the system comprising:
    an inverter output terminal coupled to the inverter;
    a terminal block comprising a conductive member electrically coupled to the inverter output terminal;
    a connector assembly comprising:
       a non-conductive sleeve retained within the opening of the housing and comprising an inner channel extending from the interior to the exterior of the housing, wherein the inner channel is configured to receive a portion of the conductive member from the exterior of the housing and a portion of the motor winding from the interior of the housing and wherein the inner channel comprises:
          a first section that retains a first segment of the conductive rod and receives a portion of the conductive member; and
          a first flange extending outwardly from the inner channel, wherein the spring member is retained between the first segment of the conductive rod and the first flange; and
       a conductive rod slidably disposed within the inner channel, coupled to the motor winding, and configured to be electrically coupled to the conductive member and to receive a force from the conductive member that causes the conductive rod to move toward the interior of the housing; and
    a spring member retained between the non-conductive sleeve and the conductive rod and configured to resist movement of the conductive rod toward the interior of the housing.

13. The system of claim 12, wherein the conductive member further comprises a first surface and the conductive rod further comprises a second surface disposed on the first segment and configured to be mated with the first surface and to receive a force from the conductive member that causes the conductive rod to move toward the interior of the housing.

* * * * *